Aug. 16, 1927.

L. REICHOLD 1,639,385

ELECTRIC TOASTER

Filed Jan. 8, 1925　　2 Sheets-Sheet 1

Inventor:
Ludwig Reichold.
By
Sturtevant & Mason
Att'ys.

Aug. 16, 1927.
L. REICHOLD
1,639,385
ELECTRIC TOASTER
Filed Jan. 8, 1925
2 Sheets-Sheet 2
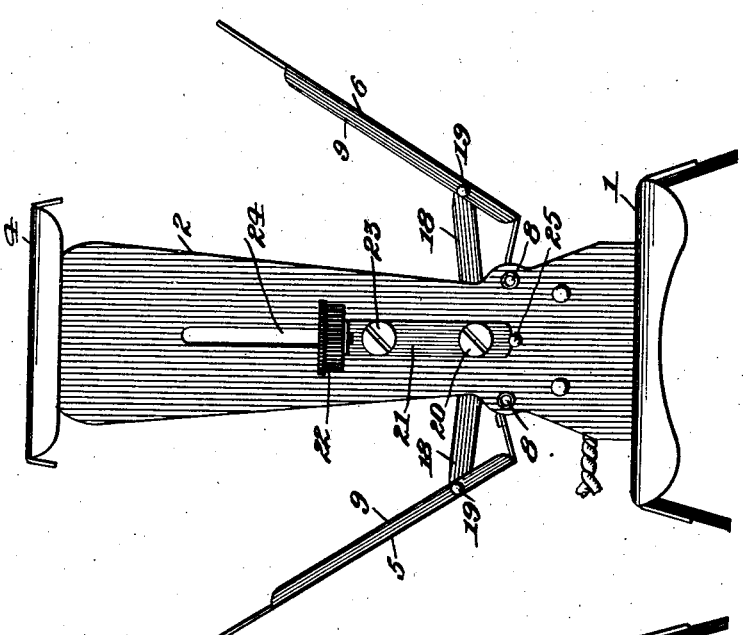
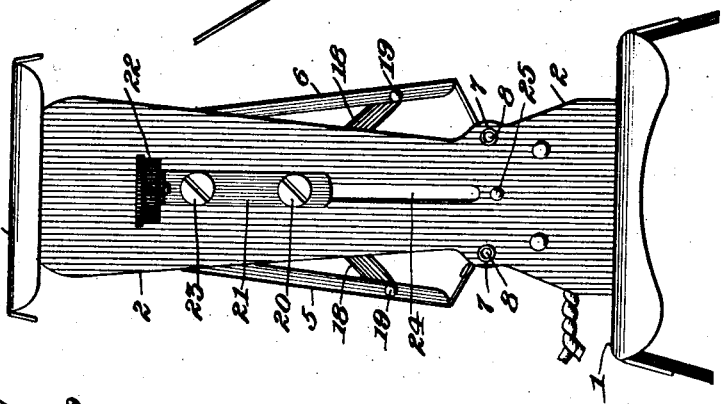
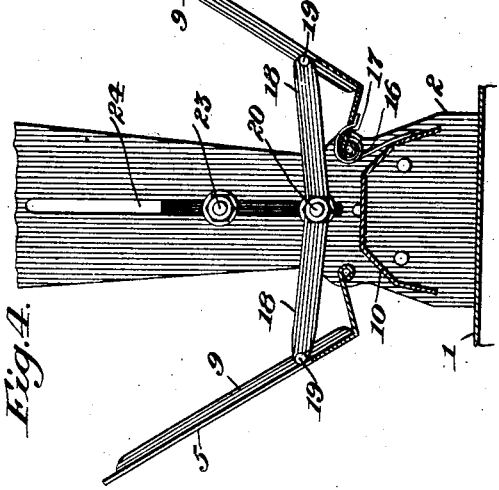
Inventor:
Ludwig Reichold
By
Sturtevant & Mason
Att'ys.

Patented Aug. 16, 1927.

1,639,385

UNITED STATES PATENT OFFICE.

LUDWIG REICHOLD, OF WINSTED, CONNECTICUT, ASSIGNOR TO THE FITZGERALD MANUFACTURING COMPANY, OF TORRINGTON, CONNECTICUT, A CORPORATION OF CONNECTICUT.

ELECTRIC TOASTER.

Application filed January 8, 1925. Serial No. 1,220.

This invention relates to certain improvements in electric toasting devices.

Among the objects of this invention is to provide a device of this character which may be cheaply manufactured and easily assembled, and which may be operated by an unskilled person without danger of burning the fingers.

Another object is to provide an electrical heater element with a pair of coordinately movable slice holders, which are held in both open and closed positions by a single spring device.

A further object is to provide a horizontally pivoted slice holder which can be quickly filled, moved to toasting position, and returned to the filling position; and when in the filling position is locked against accidental release.

With these and other objects in view, a preferred form of construction is described hereinafter and shown on the accompanying drawing, in which—

Fig. 2 is an end view showing the standard and linkage on a larger scale, with the slice holder in the open position;

Fig. 3 is a view corresponding to Fig. 2 with the slice holder in the closed position; and Fig. 4 is a fragmentary cross section, showing the spring.

Figure 1:
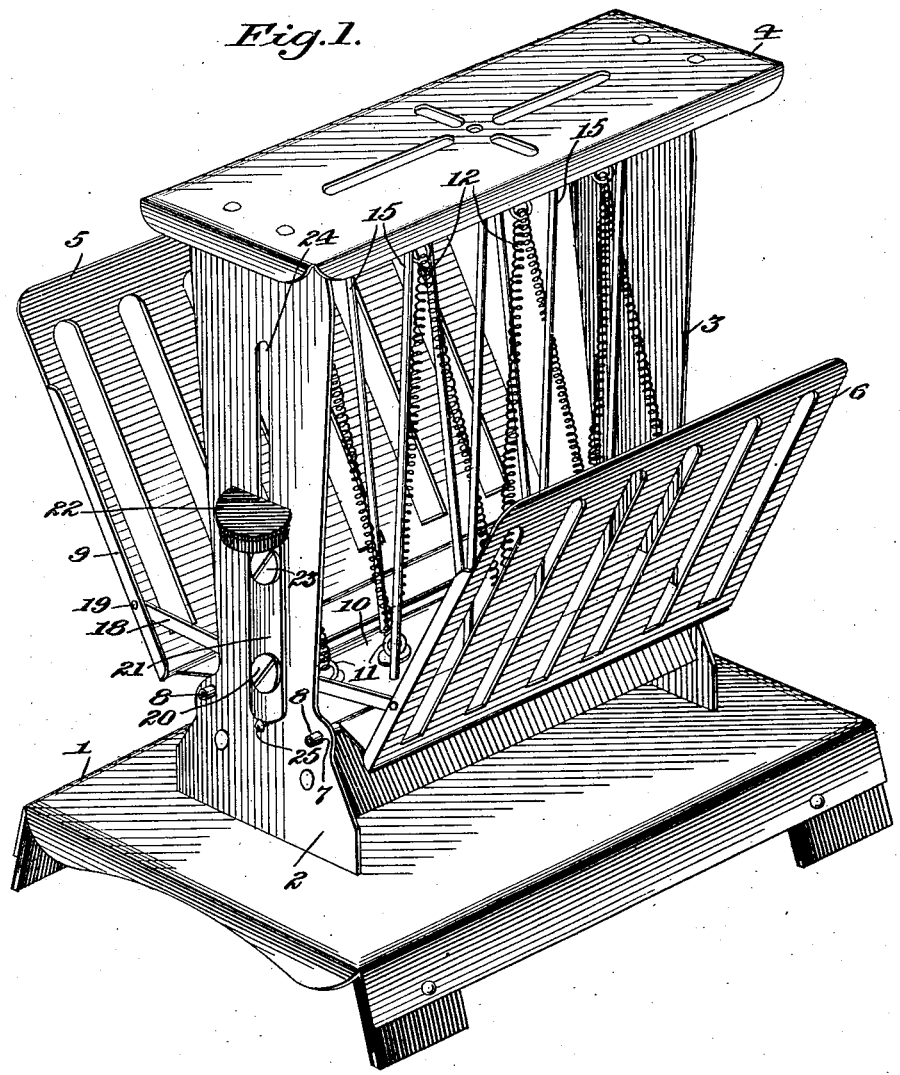
Figure 1 is a perspective view.

The toaster comprises a base 1 having standards or endpieces 2, 3 mounted thereon to support the top 4. In apertures 7 at suitable points of the standards 2, 3, are engaged the pivots 8 of a pair of slice holders 5, 6. These slice holders are preferably formed integral with the pivots 8 by appropriate punching and curling, and likewise have the integral end guides 9 for the slice of bread.

Within the standards 2, 3 is a top member (not shown) and the bottom member 10 to receive the insulated stretcher rings 11 for the electric heater element 12, here shown as a single coil of resistance wire passed in zigzag form from one terminal to the other terminal. A series of guard wires 15 are passed through apertures of the bottom member 10, and extend upward into the top member, and serve to prevent physical contact of the slice or other object with the red-hot heater element.

A spiral spring 16 is provided for each slice holder, and these springs are mounted upon the pivots 8, with the ends of each spring respectively engaged in an aperture 17 of the slice holder, and against the bottom piece 10.

Pivoted to each slice holder by a pin 19 passing through the guide 9, is a link 18. These links are joined together at their other ends by a pivot bolt 20 carried by a slider 21. This slider has a thumb button 22 at its upper end, held in position by a bolt 23. A slot 24 is provided in the standard 2, and receives the shanks of bolts 20 and 23 which thus serve as guides to assure the rectilinear movement of the slider 21 in the vertical direction. The movement of this slider is limited by the impact of the respective bolts 20 and 23 at the ends of the slot, although if desired, a pin such as 25, may be provided in the standard 2 for contact with the slider 21 itself; in any event, the lower limit of movement of the slider 21 is always such that the pivot 20 is below the straight line connecting pivot points 19, 19 of the links 18, 18.

The method of utilizing the device is as follows: When the slice holders 5, 6 are in the open position, the slider 21 associated therewith by links 18, 18, will move downward by gravity, or under the pressure of the finger into its lowermost position shown in Fig. 2. The links form a toggle, and the open position is maintained and the holders locked therein, by the fact that the pivot 20 moves past the center or extended line of the links. In this position, slices of bread are placed on the slice holders, and the button 22 is forced upward, past the extended position of the links 18, 18, and the holders are thereafter moved to the closed position by the spiral springs 16. This closed position varies somewhat by reason of differences in the thickness of the slice, but in every case, the slice is held tightly against the guards 15 under the pressure of springs 16.

When the slice is toasted on one side, the button 22 is forced downward again, until the slider 21 snaps into the lowermost position. The slice is reversed, and the former operation repeated.

It will be understood that while the form shown is preferred, no limitation is intended thereby within the scope of the appended claims.

Having thus described the invention, what I claim as new and desire to secure by Letters-Patent, is—

1. In a toaster having a vertical heater element, a pair of horizontally pivoted slice holders, resilient means to move said holders inward about their pivots toward the heater element, links connected to said holders, a mutual pivot for said links, and means to determine the movement of the mutual pivot above and below the extended position of the links.

2. In a toaster having a heater element, a frame, a pair of slice holders mounted on pivots in said frame, a slider mounted on said frame, a pair of toggle links pivoted to said holders and to said slider, and means to hold said toggle links in their end positions.

3. In a toaster having a frame and a heater element mounted thereon, a slice holder pivoted to said frame, and a device on said frame manually actuatable to rock said holder between toasting and non-toasting positions, said device including means to prevent said holder from being moved out of the non-toasting position, except by manual actuation of said device.

4. In a toaster having a frame and a heater element thereon, a pair of slice holders pivotally mounted on said frame and adapted to be moved between toasting and non-toasting relation to said heater element, and a pair of toggle links pivoted together and each pivoted to one of said holders, said links in one end position cooperating with the frame to prevent said holder from being moved from non-toasting position except by manual actuation of said means.

5. In a toaster having a frame, a heater element mounted on said frame, a pair of slice holders mounted on pivots relative to said frame and adapted to be moved to open and closed positions, toggle links to connect said holders and having a guided mutual pivot, and a spring to hold said toggle links in either of the end positions.

6. In a toaster having a frame with a slot, a heater element mounted on said frame, a slice holder pivotally mounted on said frame to rock between toasting and non-toasting positions with respect to said heater element, a link pivoted to said holder, means on said link engaging the walls of said slot for guiding thereby, and a stop adjacent one end of said slot cooperating with the said means to prevent said holder from being moved from non-toasting position except by manual actuation of said means.

7. In a toaster having a frame with a slot, a heater element mounted on said frame, a pair of slice holders pivoted to said frame, a slider mounted relative to said slot, a pair of toggle links pivoted respectively to said holders and to each other, a pivot bolt forming such mutual pivot mounted on said slider and adapted to aline said slider with said slot, and springs on said slice holders to move said holders upwardly into operative position when the slider is at one side of the extended position of the toggle links and to move said holders and links into a locked and open position when the slider is at the other side of such extended position.

8. In a toaster having a frame and a heater element mounted thereon, a slice holder pivoted to said frame, a spring to rock said holder into toasting relation to said heater, and a device on said frame manually actuatable to rock said holder between toasting and non-toasting positions, said device including means cooperating with said spring to prevent said holder from being moved out of the non-toasting position except by manual actuation of said device.

9. In a toaster having a frame and a heater element mounted thereon, a pair of slice holders pivoted to said frame and devices to coordinate the movement of said slice holders between toasting and non-toasting positions, and a spring to move said slice holders into toasting position, said coordinating devices including means to prevent said holders from being moved out of the non-toasting position except by manual actuation of said devices.

In testimony whereof, I affix my signature.

LUDWIG REICHOLD.